United States Patent [19]

Gillbrand et al.

[11] 4,104,882
[45] Aug. 8, 1978

[54] SUPER-CHARGED CARBURETOR ENGINE

[75] Inventors: Per Sune Gillbrand; Anders Erik Bertil Johansson, both of Enhörna, Sweden

[73] Assignee: Saab-Scania Aktiebolag, Sodertalje, Sweden

[21] Appl. No.: 747,386

[22] Filed: Dec. 3, 1976

[30] Foreign Application Priority Data

Dec. 10, 1975 [SE] Sweden .............................. 7513897

[51] Int. Cl.² ............................................ F02D 23/00
[52] U.S. Cl. ........................................ 60/600; 60/605; 123/119 C
[58] Field of Search ................ 60/598, 600, 601, 605, 60/611, 39.09 F; 123/119 C

[56] References Cited

U.S. PATENT DOCUMENTS 2,811,826  11/1957  Alcock ................................... 60/600
3,541,784  11/1970  Haase ..................................... 60/605

FOREIGN PATENT DOCUMENTS 439,779  12/1935  United Kingdom ............... 123/119 C Primary Examiner—Louis J. Casaregola
Attorney, Agent, or Firm—Cushman, Darby & Cushman

[57] ABSTRACT

Arrangement with a combustion engine having a fuel dosing carburetor, a throttle and a compressor situated in the engine inlet system. The carburetor is positioned upstream of the compressor and the throttle is positioned downstream of the compressor.

5 Claims, 1 Drawing Figure

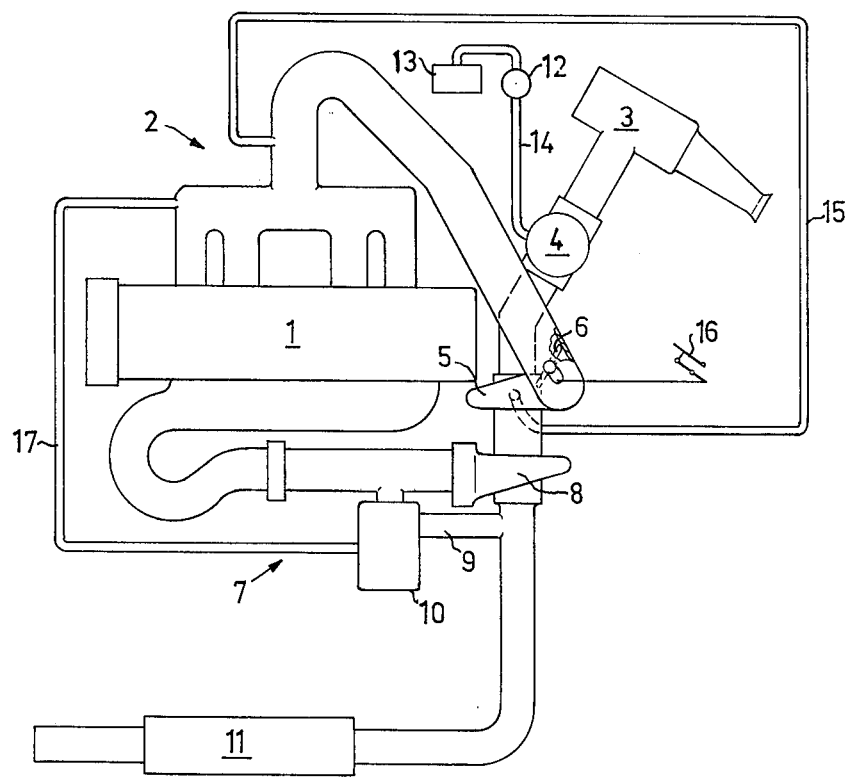

SUPER-CHARGED CARBURETOR ENGINE

The present invention relates to a combustion engine, especially intended for vehicles, fed with a fuel-air mixture whose mixture ratio and pressure are influenced by a fuel-dosing carburetor, a throttle and a compressor situated in the inlet system of the engine.

In such known engines, the carburetor with its throttle is placed either upstream or downstream of the compressor. In those cases in which the carburetor with its throttle is situated upstream, i.e. ahead of the compressor, the compressor is caused to function under a constant and, at times, great vacuum. Because of this there is a risk that the lubricant necessary for lubrication of the central portions of the compressor is sucked out of the compressor. In order to prevent said leakage, especially carefully sealed compressors have been developed, but said compressors entail a relatively high price and, furthermore, impair the performance and life span of the compressor due to increased friction losses. Said deterioration is especially noticable in a gas turbine powered compressor as the friction losses counteract attempts to obtain a satisfactory supercharging of the engine at as low engine rpms as possible.

When the carburetor with its throttle is positioned downstream, i.e. after the compressor, fuel dosing problems arise due to the carburetor being caused to function under both suction and pressure conditions. In order to deal with this problem, a specially sealed and therewith relatively expensive carburetor must be used. Furthermore, warm compressed air will flow through the carburetor, and this gives rise to problems concerning the hot start properties of the engine.

The purpose of the present invention is to eliminate the above-mentioned disadvantages and the present invention relates to a device in a compressor-fed carburetor engine, which device with simple means makes super-charging of the engine possible, a super-charging which, by means of the present device, can be made especially effective within the lower rpm range. The invention is essentially characterized in that the carburetor is positioned upstream of the compressor and the throttle is positioned downstream of the compressor.

In an advantageous embodiment of the invention, the lowest point of the compressor is connected to the engine inlet conduit downstream of the throttle by means of a drain pipe. In this manner, the fuel collected in the compressor can be introduced into the inlet system downstream of the throttle.

In another advantageous embodiment of the invention, the pressure in the inlet system is sensed downstream of the throttle, said pressure being arranged to control a valve in the exhaust system of the engine in a manner known per se in order to regulate throttling in an outlet conduit coupled in parallel with the exhaust turbine powering the compressor.

Other characteristics of the invention are revealed in the following description and claims. An embodiment exemplifying the invention is the basis for the description. Said embodiment is illustrated by the enclosed drawing, which reveals a schematic view of a compressor-fed carburetor engine.

An engine 1 is fed with a fuel-air mixture through an inlet system 2 which, seen in the flow direction, comprises an air filter 3, a carburetor 4 without a throttle, an exhaust turbine powered compressor 5, a throttle 6 and conduits connecting said components.

The exhaust gases of the engine 1 are led out through an exhaust system 7 which, seen in the flow direction, comprises an exhaust turbine 8 and, in parallel with the turbine, an outlet conduit 9. The latter comprises a flow-regulating valve 10 and a muffler 11.

During operation, the carburetor 4 is fed with fuel from a tank 13. Fuel supply is effected by means of a pump 12 via a conduit 14. The carburetor 4 is of standard type and operates under continuous vacuum, providing for mixing the fuel into the passing air flow. As used herein, the term standard type carburetor means a throttleless carburetor with or without a choke valve. During the compression of the fuel-air mixture in the compressor 5, a portion of the fuel will condense before the engine 1, and therewith the inlet system 2, has reached normal operating temperature, the condensed fuel being collected at the lowest point of the compressor 5. In view thereof, the compressor is drained by means of a conduit 15 which discharges downstream of the throttle 6. In this manner, a satisfactory fuel supply is made possible also before the engine 1 has reached full operating temperature. The drainage is especially important in those cases in which the lowest point of the compressor is lower than the level of any flow-containing part of the inlet system downstream the compressor.

Prior to entry into the engine 1, the pressure of the compressed fuel-air mixture is regulated by the throttle 6 which is connected to a manually operable control means 16 in order to regulate the angular position of the throttle 6 in a conventional manner.

The throttle 6 is advantageously placed as close to the outlet of the compressor 5 as posssible, partly in order to, by means of the turbulence created by the throttle 6, prevent a possible tendency towards condensation of the fuel on the walls of the inlet conduit following thereafter, and partly in order to minimize the volume in between the throttle 6 and the carburetor 4 so that the fuel dosing of the carburetor 4 will be adapted to the movements of the throttle 6 as quickly as possible. The latter condition reduces the risk of an unequal fuel-air mixture being fed to the engine 1 during transient operating conditions.

The pressure in the fuel-air mixture downstream of the throttle 6 influences the valve 10 through a conduit 17 to, in a known manner, regulate the exhaust flow through the outlet conduit 9. When pressure in the inlet system 2 exceeds a certain predetermined level, the valve 10 allows, as the pressure increases, a larger exhaust gas flow through the conduit 9. This results in an increasingly smaller exhaust gas flow being fed through the exhaust turbine 8. By means of such valve regulation one can avoid that super-charging gives pressure values for which the engine is not dimensioned. The exhaust turbine 8 is advantageously designed having a relatively small through-flow area so that totally satisfactory super-charging of the engine 1 can take place with relatively small amounts of exhaust, i.e. at low engine rpms.

A super-charged carburetor engine equipped with the described device has good operability under all operational conditions. The invention can be used in carburetor engines of both the conventional Otto-engine type as well as in various forms of rotary piston motors. The invention is especially advantageous in the use of an exhaust turbine powered compressor. However, even other kinds of super-charging devices can, in principle, be used.

What we claim is:

1. In an internal combustion engine, an inlet system for taking in air, mixing the air with fuel and feeding the resulting fuel-air mixture to the engine, the inlet system including in flow sequence a throttleless carburetor for mixing fuel with air flowing in the system, a compressor positioned downstream of the carburetor for compressing the resulting fuel-air mixture, a throttle positioned downstream of the compressor for regulating the pressure of the compressed fuel-air mixture flowing in the system downstream of the carburetor, and conduit means for conducting the compressed, throttled fuel-air mixture to the engine.

2. Apparatus as in claim 1 including an engine exhaust system containing an exhaust powered turbine driving said compressor, and wherein said compressor includes a lower portion which collects condensed fuel under some operating conditions; and conduit means connected between said lower portion of said compressor and said inlet system at a location downstream of said throttle for draining condensed fuel from said lower portion of said compressor.

3. Apparatus as in claim 1 including an engine exhaust system containing a turbine through which the exhaust gases flow, said turbine being drivingly connected to said compressor; and means responsive to the pressure in said inlet system for by-passing a portion of the exhaust gases around said turbine in a mode to increase the amount of by-passed gases with an increase in the pressure in said inlet system.

4. Apparatus as in claim 3 wherein said by-pass means is responsive to the pressure in said inlet system at a location downstream of said throttle.

5. Apparatus as in claim 3 wherein said compressor includes a lower portion which collects condensed fuel under some operating conditions, and conduit means connected between said lower portion of said compressor and said inlet system at a location downstream of said throttle for draining condensed fuel from said lower portion of said compressor.

* * * * *